June 9, 1959 NOBUTAKA TANAKA ET AL 2,890,283

REPEATING SYSTEM FOR TIME-DIVISION MULTIPLEX COMMUNICATION CIRCUITS

Filed May 3, 1954 3 Sheets-Sheet 1

Inventors
N. TANAKA
T. KAWAHASHI
By Philip M. Bolton
Attorney

June 9, 1959 NOBUTAKA TANAKA ET AL 2,890,283

REPEATING SYSTEM FOR TIME-DIVISION MULTIPLEX COMMUNICATION CIRCUITS

Filed May 3, 1954 3 Sheets-Sheet 2

Inventors
N. TANAKA
T. KAWAHASHI
By Philip M Bolton
Attorney

INVENTOR.
N. TANAKA
T KAWAHASHI
BY Philip M. Bolton
ATTORNEY

United States Patent Office 2,890,283
Patented June 9, 1959

2,890,283

REPEATING SYSTEM FOR TIME-DIVISION MULTIPLEX COMMUNICATION CIRCUITS

Nobutaka Tanaka and Takeshi Kawahashi, Tokyo, Japan, assignors to International Standard Electric Corporation, New York, N.Y., a corporation of Delaware Application May 3, 1954, Serial No. 427,268

Claims priority, application Japan May 2, 1953

3 Claims. (Cl. 179—15)

This invention relates to time division multiplex communication systems, particularly those in which the repeater connects more than two terminal stations.

The repeaters for systems of the type to which this invention relates have heretofore been quite complex. For example, for repeating in a number of directions it has been necessary to use the same number of transmitter-receiver units in the repeater. To prevent interference between communications from different directions, it has been necessary to use a plurality of different frequencies resulting in the requirement of a broad service band.

An object of the present invention is the provision of a simplified repeating system for time division multiplex communication.

Another object of the present invention is the provision of such a system in which the repeater only requires one frequency for transmission and one for reception.

In accordance with this invention two frequency transmission is accomplished from one to another of a plurality of terminal stations, each connected with a common repeater station over a separate communication link, the repeater station having a single receiver for the signals from all of the terminal stations, means for combining the received signals and means for transmitting the combined signals to all of the terminal stations.

The above-mentioned and other features and objects of this invention and the manner of attaining them will become more apparent and the invention itself will be best understood, by reference to the following description of an embodiment of the invention taken in conjunction with the accompanying drawings, in which:

Figs. 5 and 7 are sets of curves used in explaining the present invention while Fig. 6 is a block diagram illustrating a detail of the system of Fig. 3.

Figures 1, 2, 3, 4:
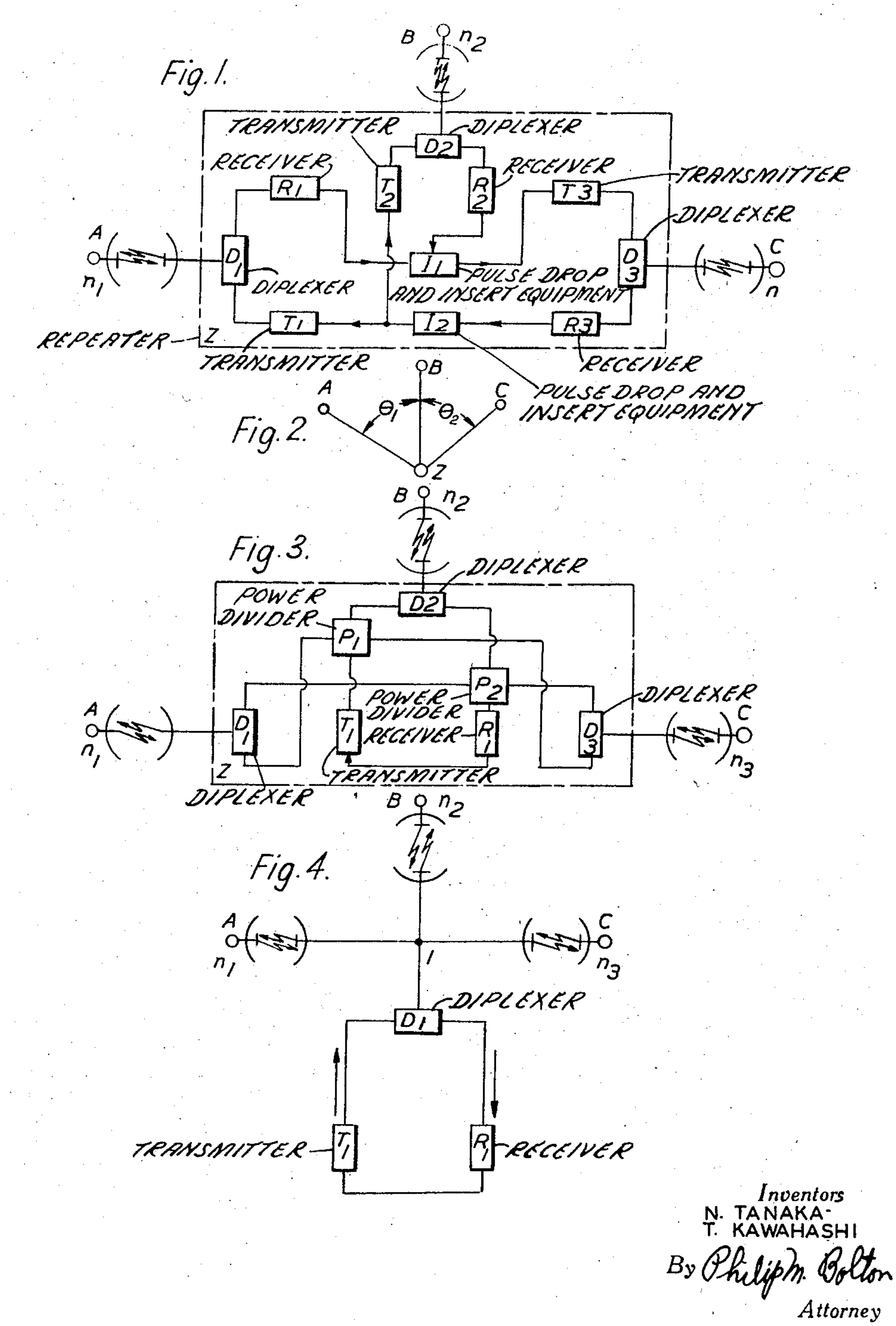
Fig. 1 is a block diagram of a conventional repeating system for pulse time division multiplex communication.
Fig. 2 is a vector diagram used in explaining Fig. 1.
Figs. 3 and 4 are block diagrams of repeating systems according to the present invention.

In a time-division multiplex communication circuit, consider a case where the signals from terminal stations A, B, C, etc., which constitute the channels $n_1$, $n_2$, $n_3$ etc., respectively, are received by a repeating station for repeating said signals to any one or any combination of two or more of said stations. For instance, suppose the transmitted signals from stations A and B, which constitute the channels $n_1$ and $n_2$ respectively, are sent to station C, while the transmitted signal from station C, which constitutes the channel $n_3$ is sent to stations A and B. In prior art systems, it has been required that transmitters $T_1$, $T_2$, $T_3$ and receivers $R_1$, $R_2$, $R_3$ be installed for stations A, B and C at the repeating station Z, as shown in Fig. 1. The transmission from stations A, B and C to and from the repeater station Z taking place over separate communication links either radio or wire. In this figure, $D_1$, $D_2$, $D_3$ denote diplexer and $I_1$, $I_2$ the pulse drop and insert equipment. In said repeating system, "$n$" sets of transmitter-receivers were needed for repeating in "$n$" directions. A further disadvantage in such a system where the angles $\theta_1$, $\theta_2$, $\theta_3$, . . . as indicated in Fig. 2 are small was that the transmitted waves from station A leak to the receiver $R_2$ at station B, substantially appearing in the output of said receiver $R_2$ as noise, resulting in the lowering of the signal-to-noise ratio. Because of this phenomenon, different frequencies have been employed for communications between the repeating station Z and the stations A, B, C, etc., resulting in the use of a broad service band.

In the present invention repeating in all directions by one transmitter-receiver is made possible while adopting only two frequencies. Fig. 3 illustrates one example of this invention. In this figure, $D_1$, $D_2$ and $D_3$ each denote a diplexer, $R_1$ a receiver, $T_1$ a transmitter, while $P_1$ and $P_2$ denote power dividers for use with transmitting and receiving waves respectively. Each of the diplexers is used for coupling the transmitter and receiver to a single antenna and may take one of several forms it being noted that transmission and reception occur on different frequencies and filters being used to separate the transmitted and received energies. These may be of conventional wave guide type as is well known in the prior art. The power dividers may likewise be of conventional construction and distribute the power in accordance with the design of the power divider. These too at ultra-high frequency may be of the wave guide type.

Figure 5:
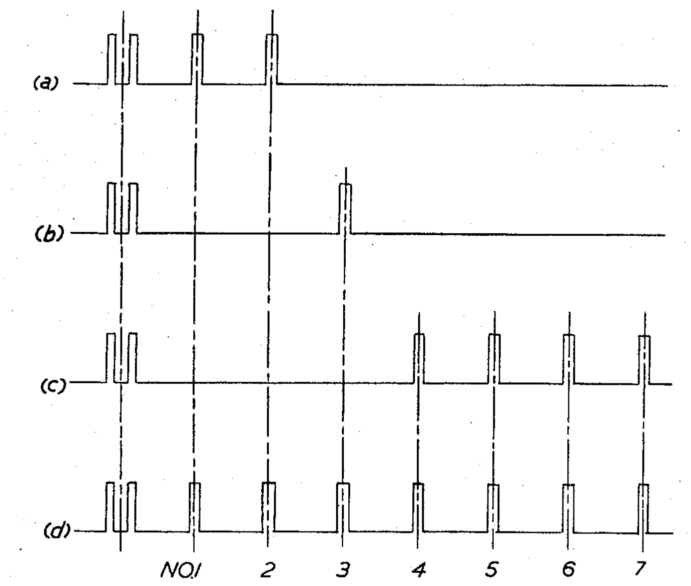

To synchronize the system and to have the signals properly phased, any one of the stations such as for example station A, may be used as the master station for transmitting master synchronizing pulses. These master synchronizing pulses may be used to control the transmission of synchronizing pulses from the repeater which in turn control stations B and C. These synchronizing pulses in turn may be separated at stations B and C and used to control the transmission therefrom in a manner known in the art so that the signals from stations B and C are received at the receiver $R_1$ in their suitable time position. Stations B and C may likewise transmit synchronizing pulses which are derived from the synchronizing pulses they have received which are suitably delayed so that they reach receiver $R_1$ coincidentally. As indicated in Fig. 5, the synchronizing pulses may consist of two pulses spaced close to each other, these synchronizing pulses then being followed by channel signal pulses. For the purposes of illustration let the relative time interval between the channel pulses and the synchronizing pulses sent from stations A, B and C be selected as indicated in Fig. 5($a$), ($b$), ($c$). The power divider $P_1$ is preferably so made that the power received at stations A, B and C may reach approximately the same level while the power divider $P_2$ is so designed that the power sent from stations A, B and C may be approximately at the same level at the input terminal of the receiver $R_1$. In Fig. 5 stations A, B and C transmit two, one and four channels respectively. Through these adjustments, the pulse shape in the output of the receiver $R_1$ at repeating station Z will become as shown in Fig. 5($d$), with the result that no mutual interference will occur among the channel pulses at stations A, B and C. Upon applying these pulses to the transmitter $T_1$, the wave form as shown in Fig. 5($d$) will be transmitted to stations A, B and C. Thus the desired repeating will be obtained by demodulating only the allotted pulses at stations A, B and C.

In case of a shift of phase in synchronizing pulses sent from any station, the signal-to-noise ratio at all the stations may be lowered. If it is known which station is sending the faulty synchronizing pulses, the transmission of the synchronizing pulses from this station may be eliminated. If this is not known then the synchronizing pulses transmitted from all the stations except one station may be eliminated, said one station serving as the master station to control the operation of all the others.

In cases where there exists severe fading between the repeating station Z and stations A, B, C etc., it is difficult to keep the receiving signal level at each station the same by the use of power distributors. For such a case, automatic volume control (AVC) must be carried out independently at receiver $R_1$ for the received signal of each station, an example of which is illustrated in Fig. 6.

At the receiver $R_1$ the received ultra-high frequency signal is heterodyned down to an intermediate frequency and amplified in an intermediate frequency amplifier. The signal from each of the stations A, B and C is taken out from the appropriate stage of the intermediate frequency amplifier, and separated from each other by each of the vacuum tubes 2, 3 and 4 respectively. The voltage of each signal is then automatically controlled independently by each of the vacuum tubes 5, 6 and 7. Each signal thereafter is mixed, detected, and finally applied to the transmitter through terminal 12. If desired, the signal from each station may be first detected and then mixed. The separation of the signal from each of the stations by each of the vacuum tubes 2, 3 and 4 may be accomplished by various methods, for instance by gating tubes 2, 3 and 4 at the appropriate times as shown in Fig. 7. This may be accomplished by applying upon the grids of the vacuum tubes 2, 3 and 4 the voltage of a wave form that will be of sufficiently high negative voltage $V_0$ to block the tubes except for the interval during which the signal pulse of the necessary station arrives, as is shown in Fig. 7(*a*), (*b*), and (*c*). Such blocking voltage wave form may be readily obtained, for example by selecting the synchronizing pulses only at terminal 12 by a marker separator 8, which are then fed through a phase shifter 9, if necessary, to a distributor delay line 10 to get two pulses of the desired phase lag, which pulses finally are applied to flip-flop circuits 11, to produce the pulses shown in Fig. 7.

To effect the automatic volume control of vacuum tubes 5, 6 and 7, any conventional arrangement such as control tubes 5', 6', 7' and the associated bias connections may be employed. In this way, a pulse train of approximately the same level can be obtained at terminal 12 independent of the circumstances of the fading between each station. Furthermore, this pulse train may be sharpened in its wave form in the modulator, the pulse train at the output of the transmitter thus having the desired wave form.

Figures 6, 7:
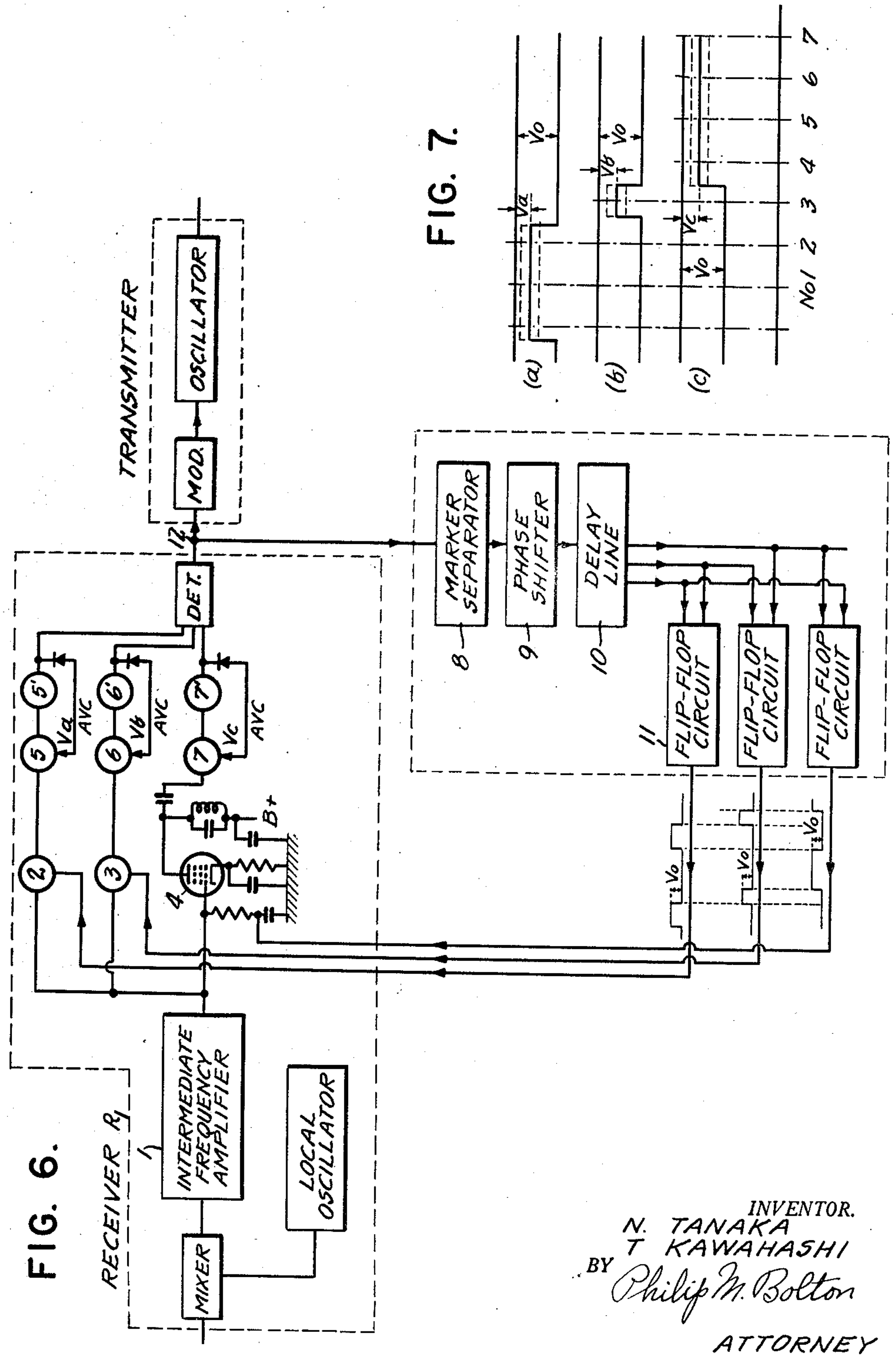

In using the system described in Fig. 6 it may be desirable to change the spacing between the channels belonging to the different stations. While in curves A, B and C we have shown the pulses of channels 1 through 7 as being equally spaced apart, if there is ample channel room, it is preferred that the channels belonging to the same station be more closely spaced together leaving a larger gap between the channels belonging to one station than those belonging to another. Thus channels 1 and 2 belonging to station A would be close together and channels 4, 5, 6 and 7 belonging to station C would be close together whereas channel 3 would be separated by a greater distance from the channels of station A and station B. This unequal spacing facilitates separation of the channels belonging to the various stations in the system of Fig. 6.

According to this invention, as heretofore described, not only is the construction of a repeating station simplified by having the repeating carried out by a single transmitter-receiver unit for many stations, but also a narrow service band can be adopted since only two frequencies are needed for communication in any number of directions or with any number of stations.

While we have described above the principles of our invention in connection with specific apparatus, it is to be clearly understood that this description is made only by way of example and not as a limitation to the scope of the invention as set forth in the objects thereof and in the accompanying claims.

We claim:

1. A multistation pulse time division multichannel system comprising at least three intercommunicating main stations, a common repeater station therefor, a plurality of separate links whereby said main stations have two-way communication with one another in different directions, each of said main stations having a transmitter for transmitting pulses over its respective link on one carrier frequency, the pulses sent by each of said main stations being in a different time division channel from those of the other main stations, and each main station having a receiver for selecting the pulses of channels allotted to it for reception, said repeater station having a common receiver for interleaving the received pulses into a single multichannel pulse train and a single transmitter coupled to said receiver for transmitting the interleaved pulses on a different carrier frequency to all main stations.

2. The system of claim 1, wherein said common receiver separates the channel pulses from each station before interleaving into a single train, and an automatic volume control circuit for substantially equalizing the amplitude of the separated channel pulses from the different stations.

3. The system of claim 1, and two power dividers in said repeater, one divider connected to the repeater transmitter for equalizing the power received at the three stations, and one divider connected to the repeater receiver for providing a common level for the signals received from said stations.

References Cited in the file of this patent

UNITED STATES PATENTS

| | | |
|---|---|---|
| 2,425,066 | Labin et al. | Aug. 5, 1947 |
| 2,547,001 | Grieg | Apr. 3, 1951 |
| 2,642,497 | Levy | June 16, 1953 |

FOREIGN PATENTS

| | | |
|---|---|---|
| 154,143 | Australia | Jan. 25, 1951 |